(12) United States Patent
Hilton et al.

(10) Patent No.: US 11,167,211 B2
(45) Date of Patent: Nov. 9, 2021

(54) SPECTATING SIMULATION

(71) Applicant: Microsoft Technology Licensing, LLC, Redmond, WA (US)

(72) Inventors: Shane H Hilton, Bellevue, WA (US); Michael Grodin, Shoreline, WA (US); Jeffrey Curtis Schlimmer, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 530 days.

(21) Appl. No.: 15/986,009

(22) Filed: May 22, 2018

(65) Prior Publication Data

US 2019/0358540 A1 Nov. 28, 2019

(51) Int. Cl.
*A63F 13/358* (2014.01)
*A63F 13/497* (2014.01)
*A63F 13/86* (2014.01)

(52) U.S. Cl.
CPC .......... *A63F 13/358* (2014.09); *A63F 13/497* (2014.09); *A63F 13/86* (2014.09)

(58) Field of Classification Search
CPC .................. A63F 13/497; A63F 2300/634
See application file for complete search history.

(56) References Cited

U.S. PATENT DOCUMENTS

| | | | |
|---|---|---|---|
| 5,558,339 A * | 9/1996 | Perlman | A63F 13/12 463/42 |
| 6,699,127 B1 | 3/2004 | Lobb et al. | |
| 7,446,772 B2 | 11/2008 | Wong et al. | |
| 7,458,894 B2 * | 12/2008 | Danieli | A63F 13/12 463/42 |
| 7,804,503 B2 | 9/2010 | Fernandez et al. | |
| 8,821,275 B2 | 9/2014 | Apirian et al. | |

(Continued)

OTHER PUBLICATIONS

"Broadcasting Virtual Games in the Internet," by Martin Otten, published Jun. 2001. (Year: 2001).*

(Continued)

*Primary Examiner* — Steven J Hylinski
(74) *Attorney, Agent, or Firm* — Ray Quinney & Nebeker P.C.; John O. Carpenter

(57) ABSTRACT

A spectator client device receives a plurality of spectator update frames that include respective actual physics state information for game objects of respective participants in a multiplayer game session. The spectator client device buffers respective ones of the spectator update frames for respective participants, and determines based on respective downlink spectator update frames buffered for the respective participants, respective simulated playback physical states at a common playback time of a current simulation period. A particular simulated playback physical state for a particular participant is determined based on actual physics state information obtained from at least two respective downlink spectator update frames buffered for the particular participant. The spectator client device renders a delayed depiction of the multiplayer game session at the common playback time of the current simulation period based on the playback physical states determined, for the respective participants, for the current simulation period.

19 Claims, 7 Drawing Sheets

(56) References Cited

U.S. PATENT DOCUMENTS

| | | | | |
|---|---|---|---|---|
| 8,834,268 | B2* | 9/2014 | Kern | A63F 13/355 |
| | | | | 463/31 |
| 8,874,661 | B2* | 10/2014 | Wild | A63F 13/12 |
| | | | | 709/206 |
| 9,364,751 | B2* | 6/2016 | Avent | A63F 13/335 |
| 9,878,252 | B2 | 1/2018 | Harris et al. | |
| 10,076,711 | B2* | 9/2018 | Malenfant | A63F 13/86 |
| 10,226,708 | B2* | 3/2019 | Bruzzo | A63F 13/48 |
| 10,543,430 | B2* | 1/2020 | Osman | A63F 13/525 |
| 10,549,204 | B2* | 2/2020 | Perry | A63F 13/86 |
| 2003/0038805 | A1* | 2/2003 | Wong | A63F 13/12 |
| | | | | 345/473 |
| 2003/0220143 | A1 | 11/2003 | Shteyn et al. | |
| 2007/0117617 | A1* | 5/2007 | Spanton | A63F 13/12 |
| | | | | 463/29 |
| 2008/0119286 | A1* | 5/2008 | Brunstetter | A63F 13/00 |
| | | | | 463/43 |
| 2008/0125226 | A1 | 5/2008 | Emmerson | |
| 2013/0083173 | A1* | 4/2013 | Geisner | G06F 3/1423 |
| | | | | 348/51 |
| 2016/0361658 | A1* | 12/2016 | Osman | A63F 13/26 |
| 2017/0011554 | A1* | 1/2017 | Burba | A63F 13/525 |
| 2017/0104819 | A1* | 4/2017 | Anastasi | G06F 9/455 |
| 2017/0246544 | A1* | 8/2017 | Agarwal | A63F 13/35 |
| 2017/0269713 | A1* | 9/2017 | Marks | G06F 3/0346 |

OTHER PUBLICATIONS

"Supporting Spectators in Online Multiplayer Games," by Ashwin Bharambe, Venkata Padmanabhan and Srinivasan Seshan. Published Jan. 2004 (Year: 2004).*

"Snapshot Interpolation," by Glen Fiedler. Published Nov. 30, 2014. Source: https://gafferongames.com/post/snapshot_interpolation/ (Year: 2014).*

"Client-Side Prediction With Physics in Unity," by Joe Best-Rotheray. Published Apr. 14, 2018. Source: https://www.codersblock.org/blog/client-side-prediction-in-unity-2018 (Year: 2018).*

"Everything you need to know about Tick Rate, Lag, Netcode, Interpolation and Etc." by Kingofheards1206. Published Nov. 25, 2015. Source: https://www.reddit.com/r/Blackops4/comments/9qkode/everything_you_need_to_know_about_tick_rate_lag/ (Year: 2015).*

"When should I extrapolate and when should I interpolate?" by Michael House. Last edited Mar. 10, 2016. Source: https://gamedev.stackexchange.com/questions/118006/when-should-i-extrapolate-and-when-should-i-interpolate (Year: 2016).*

"Advances in FPS Netcode," by U/Kovaak. Published Jan. 9, 2015. Source: https://www.reddit.com/r/truegaming/comments/2ruqba/advances_in_fps_netcode/ (Year: 2015).*

"Rollback Networking in INVERSUS," by Ryan Juckett. Published Dec. 8, 2016. Source: https://www.gamasutra.com/blogs/RyanJuckett/20161208/287162/Rollback_Networking_in_INVERSUS.php(Year: 2016).*

"Is there a way to make it not delayed?," by Radical. Published Jan. 27, 2015. Source: https://steamcommunity.com/groups/steambroadcasting/discussions/0/611696927907694289/ (Year: 2015).*

"Spectator delay :: Counter-Strike: Global Offensive General Discussions," by kid05daniel. Published Aug. 4, 2014. Source: https://steamcommunity.com/app/730/discussions/0/35219681758871016/ (Year: 2014).*

"Spectator Games: A New Entertainment Modality for Networked Multiplayer Games," by Steven M. Drucker, Li-wei He, Michael Cohen, Curtis Wong, Anoop Gupta. Published Jan. 2003. (Year: 2003).*

"Replay Mod Documentation", Retrieved from <<https://web.archive.org/web/20160812060521/https:/www.replaymod.com/docs/>>, Aug. 12, 2016, 16 Pages.

* cited by examiner

← 200

| Actual Physics State Information 202 | Actual Physics State Timestamp 203 | Predicted Physics State Information 204 | Predicted Physics State Timestamp 205 |

| Actual Physics State Information 252 | Actual Physics State Timestamp 253 |

FIG. 2B

SPECTATING SIMULATION

BACKGROUND

Multiplayer video games, such as battlefield games, car racing games, other competitive sport games, etc., bring together players of variety of kinds and ages. Many multiplayer games are available online, where players can access and participate in games over a network, such as the Internet. Such games are often equipped with in-game engine spectating capabilities, providing non-participant users the ability to view action of the games over the network. For example, a car racing game may provide non-participant users with capabilities to view a car race over the network. Such spectating systems typically use a server to provide updates of participant physics states, such as participant car positions, orientations, velocities, etc. to spectator devices. Conventionally, the server provides, to the spectating devices, predicated physics state information to enable the spectating devices to provide the spectator with a real-time version of the game based on the predicted state of the game. In such spectating systems, the state of the game shown to a spectator of the game is generally the same as that shown to participants in the game. However, the amount of predicted physics state information that the server device would need to provide to a spectating device to enable the spectating device to provide a real-time full view of the game may exceed the bandwidth available in the network. Thus, servers often limit updates to only a partial view of the game, such as to a portion that corresponds to a current zoom setting at the spectator device. As a result, at any given time, the spectator device may be able to display, for example, only a zoomed-in view of a car race with only a subset of cars participating in the car race. Moreover, predicative physics used to generate the predicted physics states may be rough and may result, for example, in discontinuities between predicted future positions of game objects (e.g., cars) and actual positions of the game objects at the corresponding future times. Such discontinuities typically result in a non-continuous or non-smooth spectator viewing experience as the spectator device attempts to realign the game objects with the actual positions.

SUMMARY

In an embodiment, a method of providing a simulation of a multiplayer game session for a non-participating spectator of the multiplayer game session includes receiving, at a spectator client device from a server device, a plurality of downlink spectator update frames, respective ones of the downlink spectator update frames including respective actual physics state information for game objects of respective participants in the multiplayer game session. The method also includes buffering respective ones of the plurality of downlink spectator update frames corresponding to respective ones of the participants in the multiplayer game session. The method further includes determining, based on respective downlink spectator update frames buffered for the respective participants, respective simulated playback physical states at a common playback time of a current simulation period at the spectator client device, wherein a particular simulated playback physical state for a particular participant is determined based on actual physics state information obtained from at least two respective downlink spectator update frames buffered for the particular participant. The method additionally includes rendering, with the client device, a delayed depiction of the multiplayer game session at the common playback time of the current simulation period, including depicting the game objects of the respective participants based on the respective simulated playback physical states determined, for the respective participants, for the current simulation period.

In another embodiment, a spectator client device comprises a buffering system configured to buffer a plurality of downlink spectator update frames received from a server device during a multiplayer game session, respective ones of the downlink spectator update frames including respective actual physics state information for game objects of respective participants in a multiplayer game session, the respective actual physics states obtained by the server device from respective uplink participant update frames received by the server device from respective participant client devices associated with the respective participants. The spectator client device also includes a playback state determination engine configured to determine based on respective downlink spectator update frames buffered for respective participants, respective simulated playback physical states at a common playback time of a current simulation period at the spectator client device, wherein a particular simulated playback physical state for a particular participant is determined based on actual physics state information obtained from at least two respective downlink spectator update frames buffered for the particular participant. The spectator client device further includes a rendering engine configured to a delayed depiction of the multiplayer game session at the common playback time based on the playback physical states determined, for the respective participants, for the current simulation period.

In yet another embodiment, a tangible computer readable medium, or media, storing machine readable instructions that, when executed by one or more processors, cause the one or more processors to: receive a plurality of downlink spectator update frames transmitted by a server device, respective ones of the downlink spectator update frames including respective actual physics state information for game objects of respective participants in a multiplayer game session, the respective actual physics states obtained by the server device from respective uplink participant update frames received by the server device from respective participant client devices associated with the respective participants; buffer the plurality of downlink spectator update frames received from the server device; determine, based on respective downlink spectator update frames buffered for respective participants, respective simulated playback physical states at a common playback time of a current simulation period at a spectator client device, wherein a particular simulated playback physical state for a particular participant is determined based on actual physics state information obtained from at least two respective downlink spectator update frames buffered for the particular participant; and render a delayed depiction of the multiplayer game session at the common playback time, including depicting the game objects of the respective participants based on the respective simulated playback physical states determined, for the respective participants, for the current simulation period.

BRIEF DESCRIPTION OF THE DRAWINGS

FIG. 2A is a diagram of an uplink participant update frame that may be utilized to provide a physics state update from a participant client device to a server device in the system of FIG. 1, according to an embodiment;

FIG. 2B is a diagram of a downlink spectator update frame that may be utilized to provide a physics state update from a sever device to a spectator client device in the system of FIG. 1, according to an embodiment;

DETAILED DESCRIPTION

Figure 1:
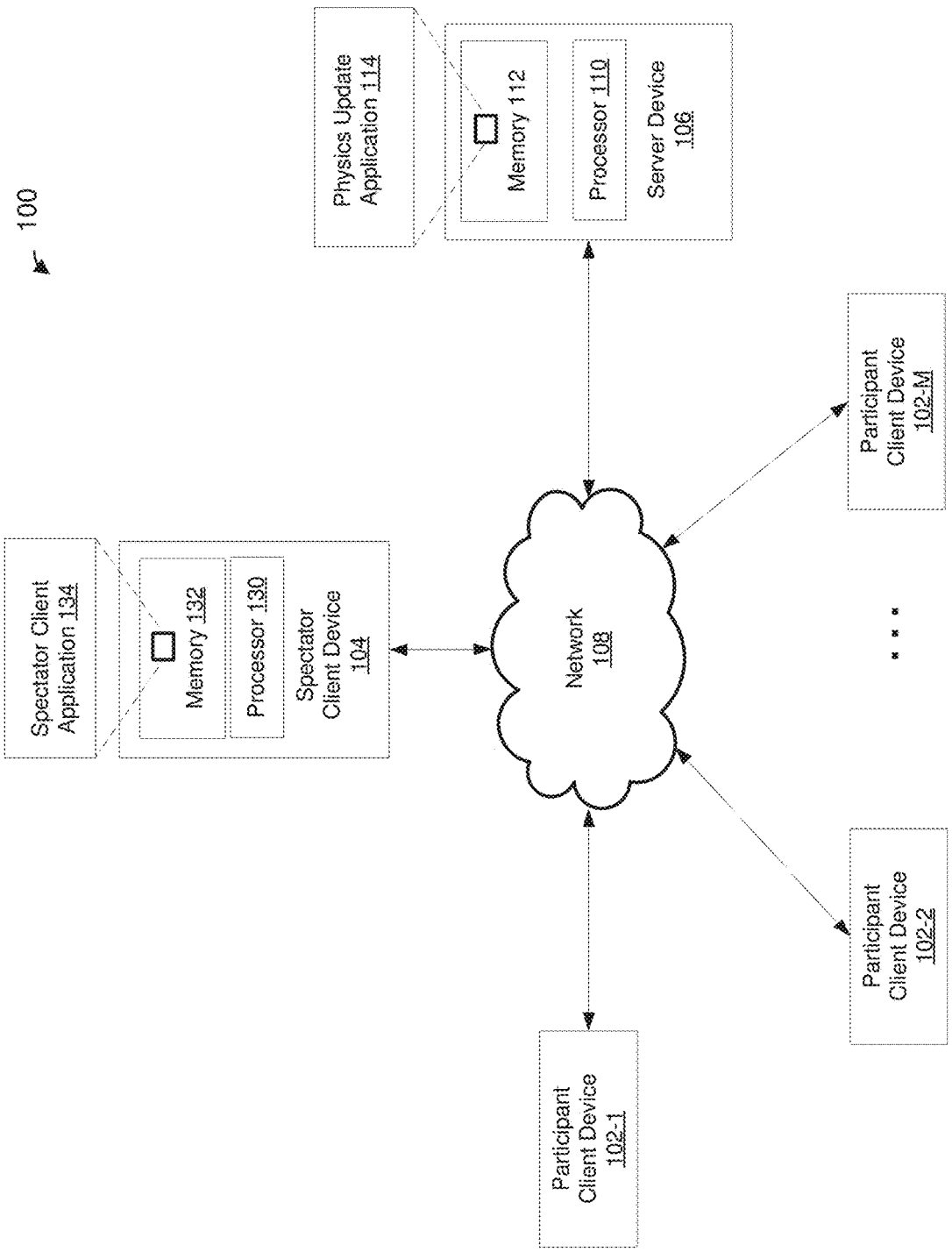
FIG. 1 is a block diagram of a system that may provide smooth spectating experience for a multiplayer video game or another video event, according to an embodiment.

In various embodiments described below, a spectating system enables a non-participant spectator to view an on-going session of a networked multi-participant event, such as a multiplayer video game. To provide a smooth full zoom rendition of a multiplayer video game session to a non-participant spectator of the game, the spectating system may generate a delayed simulation of the video game session based on actual physics state updates obtained throughout the game session from the multiple players participating in the game. For example, the spectating system may receive periodic spectator update frames that may include actual (i.e. not predicted) physics state information indicating actual physics states of participant game objects at certain points in time throughout the game session, as the physics state of the game objects changes through the action of the game. The received spectator update frames may omit any predicted physics state information that indicates predicted physics states at future time points in the game. During each of a plurality of simulation periods throughout the game session, the spectating system may buffer received spectator update frames until multiple (e.g., at least two) spectator update frames corresponding to each game participant are available for determining a simulated playback physical state of each participant at a common playback time during the simulation period. The spectating system may utilize any suitable method, such as a method involving interpolations, physics calculations, smoothing, etc., to determine, for each participant based on the actual physics state information obtained from multiple spectator update frames buffered for the participant, simulated playback physical state (e.g., simulated playback position, simulated playback orientation, etc.) of the participant's game object at the common playback time of the simulation period, thereby generating a snap-shot of respective physics states of all participant game objects at the common playback time during the simulation period. Based on the simulated playback physical states of the game objects at consecutive simulation periods, the spectating system may generate a delayed animation of the game session, and may display the delayed animation of the game session to the non-participant spectator of the game session.

In at least some embodiments, utilizing received actual physics state information to generate a delayed rendition of a game session allows for transmission of shorter and more frequent updates to the spectating system as compared to systems that utilize updates with predicted physics states of game objects to render current, no-delayed, rendition of a game session. Because shorter and more frequent updates are possible, the spectating system may receive sufficiently frequent updates for all participants in the game session, and may display a full view of the delayed version of the game session at any given time during the game, in at least some embodiments. Further, because the spectating system utilizes received actual physics state information to generate a delayed version of a game session, the spectating system may provide a more smooth spectating experience as compared to systems that utilize predicted physics state information to render current, non-delayed, version of a game session, in at least some embodiments.

FIG. 1 is a block diagram of a system 100 configured to implement and enable spectating of a multiplayer video game or another multi-participant event, according to an embodiment. In an embodiment, the system 100 implements a multiplayer car racing game (e.g., a 24-player car race) and enables spectating of the car racing game, and for ease of explanation the system 100 is described in the context of a car racing game. In other embodiments, however, the system 100 implements other suitable gaming or non-gaming events, and enables spectating of the other gaming or non-gaming events. The system 100 includes a plurality of participant client devices 102 and a spectator client devices 104. Although the system 100 is illustrated as including only a single spectator client device 104, the system 100 includes multiple spectator client devices 104, in some embodiments. The participant client devices 102 and the spectator client device(s) 104 may be coupled to a server device 106 via a network 108. The participant client devices 102 and the spectator client device(s) 104 may include, for example, personal computers, cellular phones, smart phones, and other suitable web-enabled devices communicatively coupled to the server device 106 via the network 108. The network 108 may be a wide area network (WAN) such as the Internet, a local area network (LAN), or any other suit able type of network. The network 108 may be single network or may be made up of multiple different networks, in some embodiments.

The server device 106 is illustrated in FIG. 1 as including a processor 110 and a computer readable memory 112 that stores computer readable instructions executable by the processor 110. The computer readable memory 112 may store a physics update application 114. The update physics update application 114 may be part of a game engine implementing the server side of a multiplayer video game (e.g., a car race), and may be configured to enable in-game engine spectating of the multiplayer video game. The computer readable memory 112 may include volatile memory to store computer instructions, such as Random Access Memory (RAM), and may also include persistent memory such as a hard disk, for example. In some embodiments, the server device 106 includes multiple processors 110. Further, in some embodiments, the game server engine 114 may be implemented using hardware components, firmware components, software components, or any combination thereof.

The physics update application 114 may be configured to periodically, e.g., throughout a car racing game session (e.g., a 24-player car race), obtain physics state update information from the participant client devices 102 being utilized by players (e.g., 24 players) participating in the car racing game session, and to provide physics state update information obtained from the participant client devices 102 being utilized by ones of the players participating in the car racing game session to i) the participant client devices 102 being utilized by the other ones of the players participating in the car racing game session and ii) the spectator client device 104 being utilized by a non-participant spectator to view the car racing game session. In operation, the physics update application 114 may receive uplink participant update frames that may be periodically transmitted by the participant client devices 102 to the server device 106. For example, each participant client device 102 may transmit an uplink participant update frame every 30 milliseconds (ms), or may transmit uplink participant update frames with any other suitable periodicity. An uplink participant update frame from a particular participant client device 102 may include actual current physics state information, including, for example, actual current physical state (e.g., actual current position, actual current orientation, etc.), actual current movement parameters (e.g., actual current velocity, actual current angular velocity, actual current acceleration, etc.), actual current control settings, etc. of a game object (e.g., car) of the participant client device 102 at the time of transmission of the uplink participant update frame by the participant client device 102, and may additionally include predicated future physics state information, including, for example, predicted future physical state (e.g., predicated future position, predicted future orientation, etc.), predicted future movement parameters (e.g., predicted future velocity, predicted future angular velocity, predicted future acceleration, etc.), predicated future control setting etc. of the game object, indicating a predicted physics state of the game object at a future time subsequent to transmission of the uplink participant update frame by the participant client device 102.

With continued reference to FIG. 1, based on uplink participant update frames received from ones of the participant client devices 102, the physics update application 114 may generate downlink participant update frames for the other ones of the participant client devices 102, and transmit the downlink participant update frames to the other ones of the participant client devices 102 to provide game object physics state updates to the other ones of the participant client devices 102. Also based on uplink participant update frames received from ones of the participant client devices 102, the physics update application 114 may generate downlink spectator update frames for the spectator client device 104, and may cause the downlink spectator update frames to be transmitted by the server device 106 to the spectator client device 104 to provide game object physics state updates to the spectator client device 104. In an embodiment, the physics update application 114 generates and transmits downlink spectator update frames based on uplink participant update frames received from respective participant client devices 102 in a round robin manner such that update information corresponding to the respective participant client devices 102 is sequentially provided to the spectator client device 104. In other embodiments, other suitable transmission schemes are utilized to provide update information corresponding to the respective participant client devices 102 to the spectator client device 104. The physics update application 114 may generate a downlink spectator update frame corresponding to a particular participant client device 102 based on a most recent uplink participant update frame received from the particular client device 102. In an embodiment, the physics update application 114 generates and transmits a downlink spectator update frame corresponding to each respective participant client device 102 every 200 ms. In other embodiments, other suitable periodicities are utilized.

In an embodiment, a downlink participant update frame generated by the physics update application 114 for transmission to participant client devices 102 may generally be longer, and may contain more information, as compared to a downlink spectator update frame generated by the physics update application 114 for transmission to the spectator client device 104. For example, a downlink participant update that the physics update application 114 generates based on an uplink participant update frame received from a particular participant client device 102 may include full predicted physics state information obtained from the uplink participant update frame received from the particular participant client device 102 and, in some embodiments, may also include full actual physics state information obtained from the uplink participant update frame received from the particular participant client device 102. Such downlink participant update frame may enable the other participant client devices 102 to, upon receipt of the downlink participant update frame, render the game object of the particular client device 102 based on the predicted physics state information obtained from the downlink participant update frame, thereby attempting to provide a real-time rendering of the game object at the time of receipt of the downlink participant update frame at the other participant client device 102. On the other hand, a downlink spectator update frame that the physics update application 114 generates based on an uplink participant update frame received from a particular participant client device 102 may include actual physics state information obtained from the uplink participant update frame received from the particular participant client device 102, or, in some embodiments, may include only a subset of the actual physics state information obtained from the uplink participant update frame received from the particular participant client device 102. The downlink update spectator frame may omit any predicted physics state information. Such downlink spectator update frames may enable the spectator client device 104 to determine, based on actual physics state information included in the frames, playback physical states of game objects of the participants in the game session, and display an accurate playback or delayed version of the game session, as will be explained on more detail below, in various embodiments.

In various embodiments, including actual physics state information in downlink spectator update frames to the spectator client device 104 and omitting predicated physics state information from the downlink spectator update frames to the spectator client device 104 allows the physics update application 114 to provide more frequent updates to the spectator client device 104 as compared to systems that provide predicted state information to spectator devices to enable non-delayed rendering of the game session by the spectator devices. For example, systems that provide predicted state information to spectator devices are unable (e.g., due to bandwidth limitations) to provide to a spectator device sufficiently frequent updates for all participants in the game session being viewed on the spectator device, and therefore such systems provide to the spectator device updates for only a subset of participants in the game session being viewed, such as updates for only those game participants that are in a zoomed view currently being displayed by the spectator device. On the other hand, the physics update application 114 provides to the spectator client device 104 sufficiently frequent updates for all participants in the game session, allowing the spectator client device 104 to accurately display a delayed full-view version of the game session, or of any suitable zoomed-in view of the game session, in at least some embodiments.

With continued reference to FIG. 1, the spectator client device 104 is illustrated as including a processor 130 and a computer readable memory 132 that stores computer readable instructions executable by the processor 130. The computer readable memory 132 may store a spectator client application 134. The computer readable memory 132 may include volatile memory to store computer instructions, such as Random Access Memory (RAM), and may also include persistent memory such as a hard disk, for example. In some embodiments, the spectator client device 104 includes multiple processors 130. Further, in some embodiments, the spectator client 134 may be implemented using hardware components, firmware components, software components, or any combination thereof.

The spectator client application 134 may receive the downlink spectator update frames generated by the physics update application 114 and transmitted by the server device 106. Based on received downlink spectator update frames, the spectator client application 134 may determine respective simulated playback physical states (e.g., positions, orientations, etc.) of the game objects of the participant client devices 102 at certain common playback times during current simulation periods, and may use the determined simulated playback physical states to render delayed versions of the game session corresponding to the certain common playback times. In an embodiment, the spectator client application 134 is configured to determine a simulated playback physical state of a game object of a particular participant client device 102 based on multiple consecutively received update frames containing update information of the particular participant client device 102. For example, the spectator client application 134 may determine a simulated playback physical state of a game object of a particular participant client device 102 by interpolating between multiple consecutively received update frames containing update information of the particular participant client device 102. These and other techniques described herein allow the spectator client application 134 to provide a smooth spectator experience of a game session by rendering a delayed playback version of the game session based on actual physics state information obtained for participant game objects rather than attempting to provide a real-time non-delayed version of a game session based on predicted future physics states obtained for the participant game objects, in various embodiments.

FIG. 2A is a diagram of an uplink participant update frame 200, according to an embodiment. In an embodiment, the game client user devices 102 are configured to periodically transmit uplink participant update frames such as the uplink participant update frame 200 to the server device 106. For ease of explanation, the uplink participant update frame 200 is described below with reference to the system 100 of FIG. 1. However, the uplink participant update frame 200 is used with systems different from the system 100 of FIG. 1, in some embodiments. Similarly, the system 100 of FIG. 1 utilizes uplink participant update frames different from the uplink participant update frame 200, in some embodiments.

Generally, each participant client device 102 may periodically transmit uplink participant update frames such as the uplink participant update frame 200 during a game session, to provide to the server device 106 updates on the physics state of a game object of the client user device 102 as the physics state of the game object changes throughout the game session. For example, in a car racing game, each participant client device 102 may periodically transmit uplink participant update frames such as the uplink participant update frame 200 during a car race game session, to provide to the server device 106 updates on the physics state of the participant's car as the physics state of the car changes throughout the car race. In an embodiment, each participant client device 102 transmits an uplink participant update frame such as the uplink participant update frame 200 every 60 ms. In other embodiments, each participant client device 102 transmits an uplink participant update frame such as the uplink participant update frame 200 with a suitable periodicity different from 60 ms.

The uplink participant update frame 200 includes an actual physics state information field 202, an actual physics state timestamp field 203, a predicted physics state information field 204, and a predicted physics state timestamp field 205, in an embodiment. The actual physics state information field 202 may indicate an actual current physics state of the player's game object at a time corresponding to a time indicated in the actual physics state timestamp field 203, which may correspond to a time at which the uplink participant update frame 200 is generated and transmitted by the participant client device 102. The actual current physics state information field 202 may include any suitable information describing a physics state of the player's object, such as object's current actual physical state, including e.g., current actual position (e.g., x, y, z coordinates) and object's current actual orientation, object's current actual velocity, object's current actual angular velocity, object's current actual acceleration, current control actual settings associated with the object etc. In a car racing game, for example, the actual physics state information field 202 may include any suitable combination of one or more of: a current actual physical state of the player's car (e.g., a current actual position (e.g., x, y, z coordinates) of the player's car and, in some embodiments, a current actual orientation of the player's car), a current actual velocity of the player's car, a current actual angular velocity of the player's car, current actual driver control settings, such as a current actual clutch setting, a current actual break setting, a current actual steering wheel setting, etc.

The predicted physics state information field 204 may include predicted physics state of the player's game object at a particular future time relative to the time indicated in the actual physics state timestamp field 203. The particular future time corresponding to the predicted physics state may be indicated in the predicted physics state timestamp field 205. The predicted physics state of the player's game object may be determined by the participant client device 102, for example using a physics engine that applies a suitable physics model to the current physics state of the player's object. The predicted physics state information field 204 may include respective predicted physics state parameters corresponding to the actual physics state parameters included in the actual physics state information field 202. For example, in a car racing game, the predicted physics state information field 204 may include any suitable combination of one or more of: a future predicted position (e.g., x, y, z coordinates) of the player's car, a future predicted orientation of the player's car, a future predicted velocity of the player's car, a future predicted angular velocity of the player's car, future predicted driver control settings, such as a future predicted clutch setting, a future predicted break setting, a future predicted steering wheel setting, etc.

FIG. 2B is a diagram of a downlink spectator update frame 250, according to an embodiment. With reference to the system 100 of FIG. 1, the server device 106 (e.g., the physics update application 114 of the server device 106) is configured to generated and transmit downlink spectator update frames such as the downlink spectator update frame 250 to the spectator client device 104, in an embodiment. For ease of explanation, the downlink spectator update frame 250 is described below with reference to the system 100 of FIG. 1. However, the downlink spectator update frame 250 is used with gaming systems different from the gaming system 100 of FIG. 1, in other embodiments. Similarly, the gaming system 100 of FIG. 1 utilizes downlink spectator update frames different from the downlink spectator update frame 250, in some embodiments.

The downlink spectator update frame 250 includes an actual physics state information field 252 and an actual physics state timestamp field 253, in an embodiment. The physics update application 114 may generate the downlink spectator update frame 250 corresponding to a particular participant client device 102 based on an uplink participant update frame (e.g., the uplink participant update frame 200) most recently received from the particular participant client device 102. The actual physics state timestamp field 253 may indicate a time obtained from the actual physics state timestamp field 203 of the uplink participant update frame 200 most recently received from the particular participant client device 102. The actual physics state information field 252 may include at least a subset of the actual physics state information (e.g., only actual physical state information and control settings information) obtained from the actual physics state information field 202 of the uplink participant update frame 200 most recently received from the particular participant client device 102. The downlink spectator update frame 250 may omit any predicted physics state information. For example, the downlink spectator update frame 250 does not include any predicted physics state information obtained from the predicted physics state information field 204 of the uplink participant update frame 200 most recently received from the particular participant client device 102, in an embodiment. Because the downlink spectator update frame 250 omits predicated physics state information and, in some embodiments, includes only a subset of actual physics state information, the spectator update frame 250 is generally shorter than spectator update frames used in systems that transmit predicted physics state information and/or full actual physics state information to spectator devices, in at least some embodiments. Transmitting such shorter downlink spectator update frames to the spectator client device 104 may allow the server device 106 to provide more frequent updates and/or updates corresponding to a greater number of participants as compared to systems in which a greater amount of update information (e.g., including full actual physics state information and full predicted physics state information) is provided to a spectator client device. Thus, for example, whereas systems that provide a greater amount of update information to a spectator device provide updates of only a subset of participants to the client device, the server device 106 may generally provide, to the spectator client device 104, sufficiently frequent updates corresponding all participants throughout the game session, to allow the spectator client device 104 to display full view version of the game session, in at least some embodiments.

Figure 3:
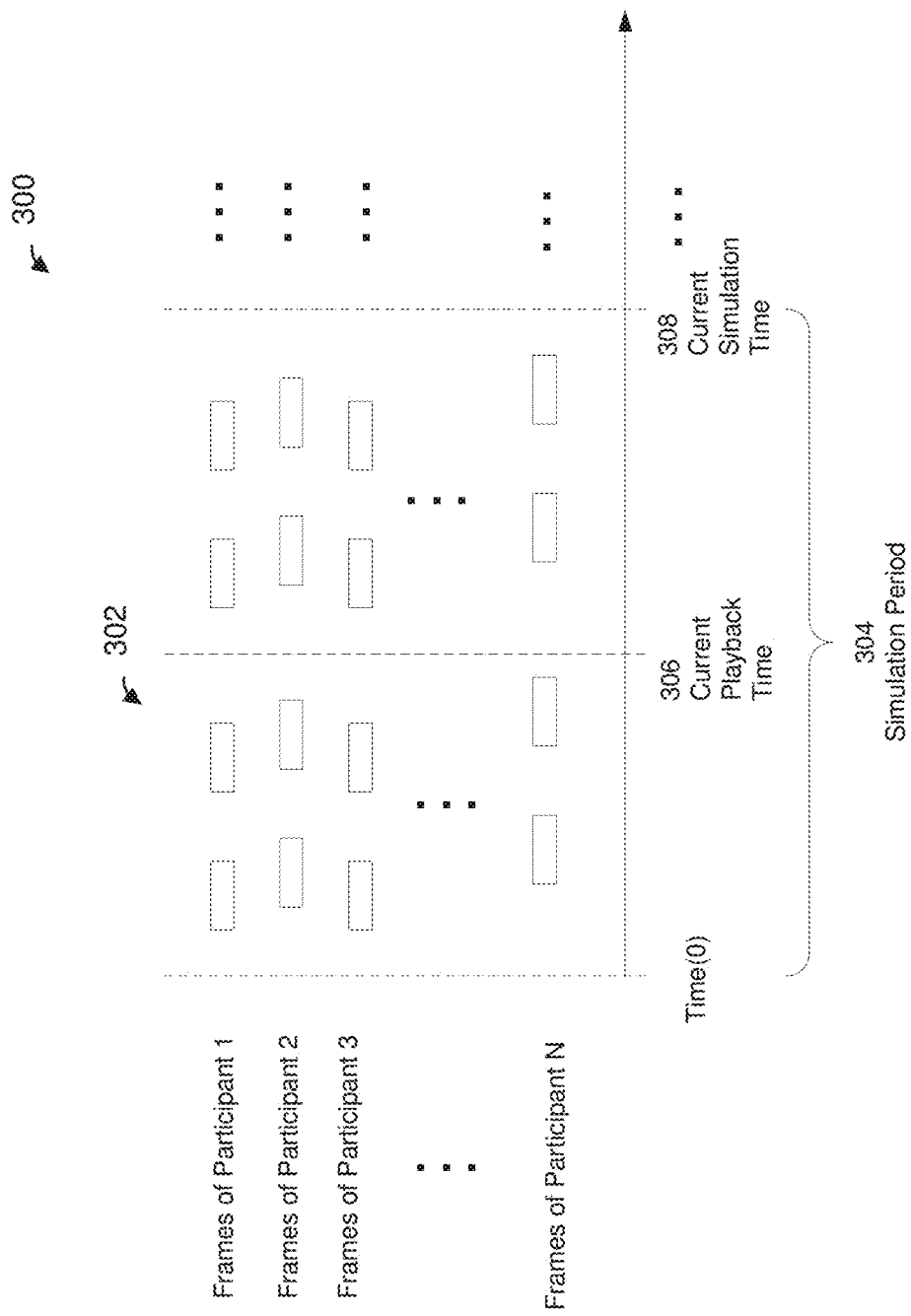
FIG. 3 is a timing diagram of an example procedure that may be utilized by a spectator client device to determine playback physical states based on downlink spectator update frames received from a server device in the system of FIG. 1, according to an embodiment.

FIG. 3 is a timing diagram of an example procedure 300 associated with receiving downlink spectator update frames 302 (sometimes referred to herein as simply "update frames 302"), and determining simulated playback physical states based on received downlink spectator update frames 302, according to an embodiment. In an embodiment, the procedure 300 is implemented by the spectator client device 104 (e.g., the spectator client application 134) of FIG. 1 to determine simulated playback physical states. For ease of explanation, the procedure 300 is described below with reference to the system 100 of FIG. 1. However, the procedure 300 is used with systems different from the system 100 of FIG. 1, in some embodiments. Similarly, the system 100 of FIG. 1 utilizes procedures different than the procedure 300 to determine simulated playback physical states, in some embodiments.

Generally, the spectator client application 134 may periodically receive, from the server device 106, downlink spectator update frames 302 corresponding to each of the respective participant client devices 102 during a game session, and may generate, based on the downlink spectator update frames 302, a simulation showing movement of participant game objects to allow a spectator to view action of the game session. To generate the simulation showing movement of the participant game objects in the game session, the spectator client application 134 may, in each of a plurality of steps or simulation periods during the game session, buffer received downlink spectator update frames 302 corresponding to respective participant client devices 102. The spectator client application 134 may generate a delayed version of the game session, based on actual physics state information obtained from the received downlink spectator update frames 302 and buffered, for example, in a memory of the spectator client device 104. For example, in each simulation period, the client spectator device 104 may determine simulated playback physical states of the respective game objects by interpolating to the common playback time based on multiple (e.g., at least two) downlink spectator update frames 302 buffered for each of the respective participant client device 102.

Referring to the example scenario illustrated in FIG. 3, a time 0 in the procedure 300 may correspond to a beginning of a game session associated with the participant client devices 102. For example, the time 0 may correspond to a start of a car race. At this time, the spectator client application 134 may not have yet received any update frames corresponding to the participant client devices 102. As the time progresses, the spectator client application 134 may begin receiving downlink spectator update frames 302 corresponding to the participant client devices 102. The downlink spectator update frames 302 may correspond to the downlink spectator update frames 250 of FIG. 2B, for example, according to an embodiment. The spectator client device 104 may buffer the received downlink spectator update frames 302 in a memory until a sufficient number of downlink spectator update frames 302 corresponding to the respective participant client devices 102 is available for determining respective playback states for the participant client device during a simulation period 304. The sufficient number of update frames 302 to be buffered may be predetermined and/or configurable. For example, the spectator client application 134 may buffer the received update frames 302 until at least four downlink spectator update frames 302 corresponding to each participant have been received. In other embodiments, other suitable sufficient numbers of downlink spectator update frames 302 (e.g., at least two downlink spectator update frames 302 corresponding to each participant, at least three downlink spectator update frames 302 corresponding to each participant, etc.) are utilized.

With continued reference to FIG. 3, when the sufficient number of downlink spectator update frames 302 are available, the spectator client application 134 may determine a respective simulated playback physical state corresponding to a common playback time 306 of game objects (e.g., cars) of the respective participants based on the corresponding buffered downlink spectator update frames 302 associated with the respective participants. For example, the spectator client device 104 may determine a physics state of a game object of a particular participant by interpolating between physics states indicated in the buffered downlink spectator update frames 302 corresponding to the particular participant. In other embodiments, other suitable techniques are used to determine a physics state for a particular participant based on the buffered downlink spectator update frames 302 associated with the particular participant. The spectator client application 134 may then display the participant game objects in the game session being viewed by a spectator, with displayed positions and/or other physical characteristics of the participant game objects being rendered based on the determined respective physics states at the common playback time 306 for the respective participant game objects.

The spectator client application 134 may continue buffering additional downlink spectator update frames 302 received in a next simulation period (not shown), and when a sufficient number of additional downlink spectator update frames 302 (e.g., one additional spectator update frame 302 for each participant) are available for determining respective playback states for the participant client devices during the next simulation period, the spectator client device 106 may determine respective physics states of the participant game objects at a next common playback time during the next simulation period. The spectator client application 134 may then update rendition of the game session to display the game session at the next common playback time, so that the participant game objects are moved to the playback physical states determined for the next common playback time. The process of receiving and buffering additional downlink spectator update frames 302, and updating rendition of the game session to move participant game objects to physics states determined for next common playback times during next simulation periods, may be repeated throughout the game session to provide the spectator a smooth delayed rendition of the game session, in an embodiment.

In some embodiments, if the spectator client application 134 stops receiving sufficient numbers of update frames 302 for a particular participant client device 102 (or particular participant client devices 102), for example if a connection between the server device 106 and the particular participant client device 102 is temporarily lost or the speed of the connection is significantly reduced, the spectator client application 134 may temporarily suspend simulation of the game session, until sufficient numbers of update frames 302 are available for all participants of the game session. When simulation is temporarily suspended, the spectator may be unable to continue viewing the game session. In this case, the spectator client application 134 may cause a predetermined view, such as a frozen or a blacked-out screen (e.g., with a message indicating a temporary suspension of simulation) to be temporarily shown to the spectator. During suspension of the simulation, the spectator client application 134 may keep progressing the current simulation period and the corresponding playback time of the current simulation period. The spectator client application 134 may continue receiving update frames 302 corresponding to respective participants, and may continue buffering the update frames 302 while discarding older or less useful update frames 302, for example as described in more detail below in connection to FIG. 4. Once reception of the update frames 302 corresponding to the particular participant client device(s) 302 is resumed, and a sufficient number of update frames 302 is again buffered for each participant, the spectator client application 134 may resume simulation, and may restore the spectator's view of the simulation.

Figure 4:
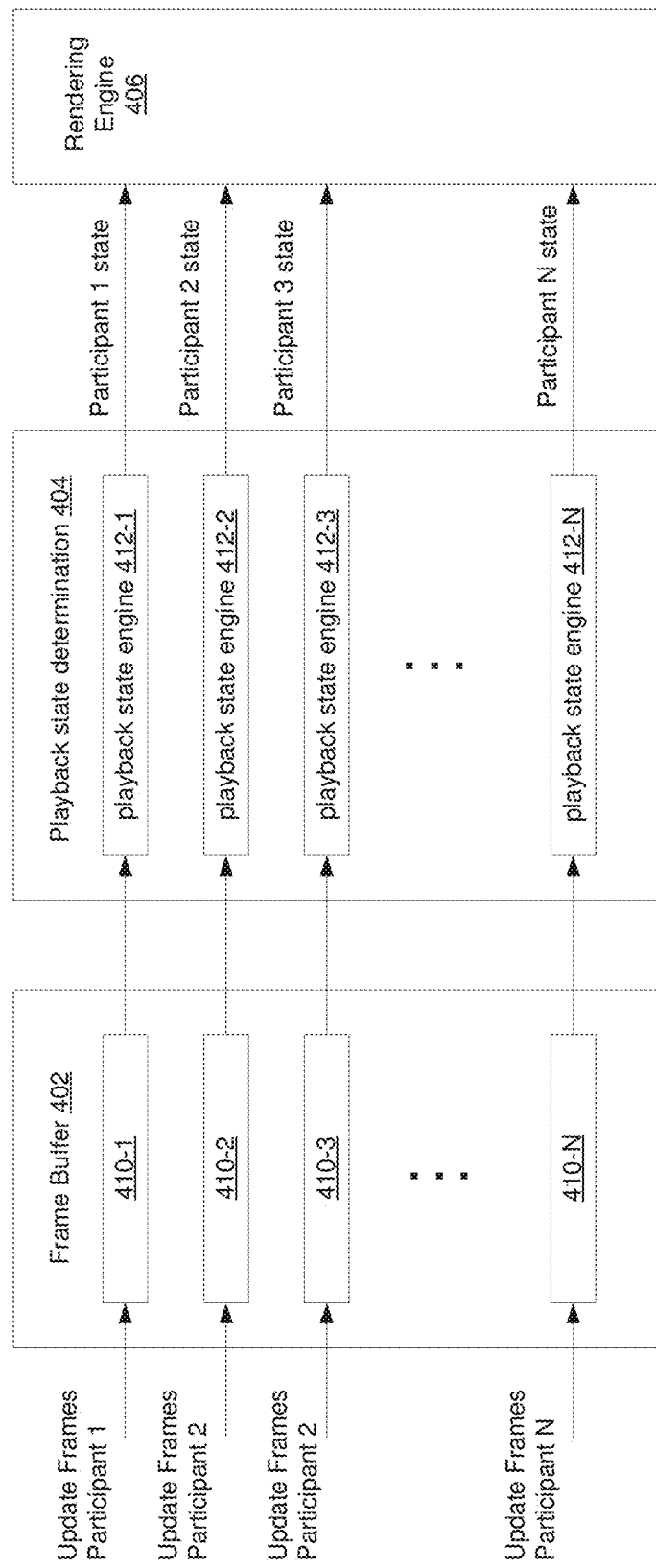
FIG. 4 is a block diagram of a spectator system that may be implemented by a spectator client device in the system of FIG. 1, according to an embodiment.

FIG. 4 is a block diagram of a spectator system 400 that may be implemented by a spectator client device, according to an embodiment. In an embodiment, the spectator system 400 is implemented by the spectator client device 104 (e.g., the spectator client application 134) of the system 100 of FIG. 1. For ease of explanation, the spectator system 400 is described below with reference to the system 100 of FIG. 1. However, the spectator system 400 is used with systems different from the system 100 of FIG. 1, in some embodiments. Similarly, the system 100 of FIG. 1 utilizes spectator systems different from the spectator system 100 of FIG. 1.

The spectator system 400 includes buffering system (e.g., a memory) 402, a playback state determination engine 404 and a rendering engine 406, in the illustrated embodiment. The buffering system 402 may comprise a plurality of fame buffers 410 to buffer downlink spectator update frames, such as the downlink spectator update frames 302, that the spectator client device 104 receives from the server device 106. Respective ones of the frame buffers 410 may correspond to respective ones of the participants in the game session, and may be used to buffer received spectator update frames 302 associated with the corresponding participants in the game session. Thus, for example, in an embodiment in which the game session is a 24-player car race, the memory 402 may include 24 frame buffers 410 respectively corresponding to respective ones of the 24 participants in the game session and used to buffer received downlink spectator update frames associated with the corresponding ones of the 24 participants in the game session.

In an embodiment, the frame buffers 410 are first in first out (FIFO) wrap-around buffers. In this embodiment, a frame buffer 410 may be configured to store up to a certain number n of downlink spectator update frames, and once the certain number n of downlink spectator update frames is reached, a next frame overwrites the oldest frame in the frame buffer 410, and so on. In other embodiments, other suitable buffer configurations are used. In an embodiment, the spectator client application 134 stores downlink update frames 302 corresponding to a particular participant, in a frame buffer 410 associated with the particular participant, as an ordered set of update frame 302, ordered according to timestamps in the update frames 302 corresponding to the particular participant. In some embodiments, the spectator client application 134 may be configured to, in each simulation period, keep certain update frames 302 in the frame buffers 410 and discard other update frames 302 from the frame buffers 410. For example, as the playback time of the current simulation progresses passed the timestamp in an update frame 302 stored in the frame buffer 410, the spectator client application 134 may discard the update frame 302 from the frame buffer 410. As another example, the spectator client application 134 may store in a frame buffer 410 associated with a particular participant only those update frames 302 that have timestamps that are the closest to the playback time of the current simulation period. For example, if the spectator client application 134 is configured to utilize four update frames 302 for determining a playback physical state in a simulation period, the spectator client application 134 may store in each frame buffer 410 four update frames 302 with the closest timestamps to the playback time of the current simulation period. If an update frame 302 with a closer timestamp is received for a particular participant, the spectator client application 134 may insert the received update frame 302 into the ordered set stored in the frame buffer 410 associated with the particular participant, and may discard from the frame buffer 410 an update frame with a timestamp that is farthest from the playback time of the current simulation period. In another embodiment, the spectator client application 134 may discard an update frame 302 from the ordered set of update frames 302 stored in the frame buffer 410 if the update frame 302 is a threshold number of update frames 302 away from the playback time of the current simulation period. In an embodiment, the threshold number for discarding update frames is predetermined and/or configurable. For example, the spectator client application 134 may discard an update frame 302 from the ordered set of update frames 302 in a frame buffer 410 if the update frame 302 is more than two update frames away from the playback time of the current simulation period, in an embodiment. In other embodiments, other suitable thresholds are utilized.

In an embodiment, in order to provide sufficient memory space in the frame buffers 410 to buffer a sufficient number of downlink spectator update frames for each participant during a simulation period, a depth of the frame buffers 410 is determined by a longest latency of respective latencies from the participant client devices 102 and the server device 106. In other words, the frame buffers 410 may be provided with enough depth to buffer downlink spectator update frames corresponding to lower latency participant client devices 102 until the sufficient number of downlink spectator update frames corresponding to the highest latency participant client device 102 are received.

With continued reference to FIG. 4, the playback state determination engine 404 may comprise a plurality of playback state engines 412 respectively corresponding to respective ones of the participants in the game session. Thus, for example, in an embodiment in which the game session is a 24-player car race, the playback state determination engine 404 may include 24 playback state engines 412 respectively corresponding to each of the 24 cars participating in the car race. A respective playback state engine 412 corresponding to a particular car participating in the car race may comprise a physics model of the particular car, including, for example, car parameters that may be used for simulating movement (e.g., velocity, acceleration, etc.) of the corresponding car. Respective playback state engines 412 may be coupled to corresponding respective frame buffers 410, and may be configured to receive, at a current simulation time, downlink spectator update frames 302 buffered in the corresponding respective frame buffers 410. Based on downlink spectator update frames 302 received at a current simulation time from the corresponding frame buffer 410, the playback state engines 412 may determine simulated playback physical states, corresponding to a common playback time of the current simulation period, of the cars of the participants in the game session. For example, referring to FIG. 3, each playback state engines 412 may receive, at the current simulation time 308, four downlink spectator update frames 302 buffered in the corresponding frame buffer 410 for the current simulation period 304, and may determine, based on the four downlink spectator update frames 302, a simulated playback physical state corresponding to the common playback time 306 of the current simulation period 304. An example embodiment of a playback state engine is described in more detail below with respect to FIG. 5.

The determined physics states at the common playback time of the current simulation period may be provided to the rendering engine 406. The rendering engine 406 may be configured to update a display of the game session such that game objects (e.g., cars) of the participants in the game session are updated based on the simulated playback physical states of the game objects determined by the corresponding playback state engines 412 for the current simulation period. For example, in the embodiment in which the game session is a 24-player car race, the rendering engine 406 may update the display of the game session so that each of the 24 cars is displayed at a position, orientation etc., determined by the corresponding playback state engines 412 for the current simulation period.

In the next simulation period, the respective playback state engines 412 may receive downlink spectator update frames 302 buffered for the next simulation period, and may determine simulated playback physical states corresponding to a next common playback time of the next simulation period. The physics states determined for the next common playback time may be provided to the rendering engine 406, and the rendering engine 406 may again update the display of the game session such that the game objects (e.g., cars) of the participants in the game session are rendered based on the simulated playback physical states of the game objects determined for the next common playback time of the next simulation period. The process of determining updated playback states and updating the display based on the determined updated playback states may continue for the duration of the game session, to provide a spectator a smooth experience of viewing a delayed version of the game session.

Figure 5:
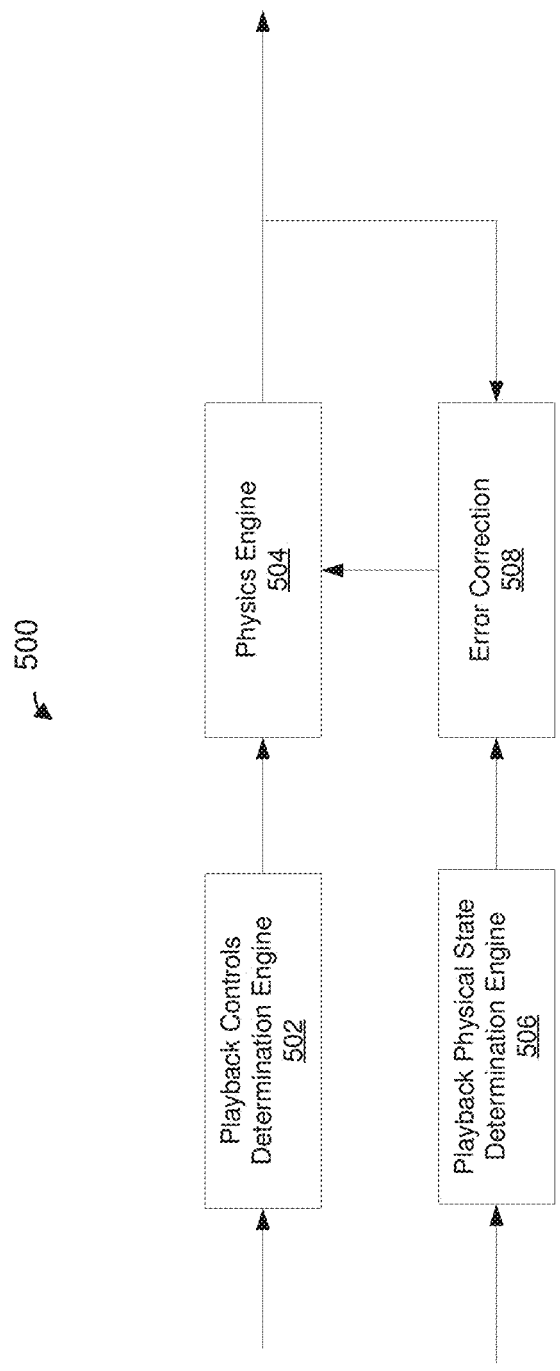
FIG. 5 is a block diagram of a playback physical state determining engine that may be utilized with the spectator system of FIG. 4, according to an embodiment.

FIG. 5 is a block diagram of a playback state engine 500, according to an embodiment. In an embodiment, each playback state engine 412 of the spectator system 400 of FIG. 4 comprises a playback state engine such as the playback state engine 500. For ease of explanation, the playback state engine 500 is described below with reference to the spectator system 400 of FIG. 4. However, the playback state engine 500 is used with spectator systems different from the spectator system 400 of FIG. 4, in other embodiments.

The playback state engine 500 includes a playback controls determination engine 502 coupled to a physics engine 504. The playback controls determination engine 502 is configured to determine playback control settings, such as a playback clutch setting, a playback break setting, a playback steering wheel setting, etc., of the game object at the current common playback time 306. In an embodiment, the playback controls determination engine 502 determines the playback control settings by interpolating between actual control settings obtained from the downlink spectator update frames 302 provided to the playback state engine 500 for the current simulation period. For example, the playback controls determination engine 502 may perform Hermite interpolation to interpolate between actual control settings obtained from the downlink spectator update frames 302 to determine a playback controls setting interpolated to the current common playback time 306. In other embodiments, the playback controls determination engine 502 utilizes other suitable interpolation methods to interpolate between actual control settings obtained from the downlink spectator update frames 302, or utilizes suitable techniques other than interpolation, to determine a playback controls setting at the current common playback time 306 based on the actual control settings obtained from the downlink spectator update frames 302 provided to the playback state engine 500 for the current simulation period.

The playback controls settings determined by the playback controls determination engine 502 are provided to the physics engine 504. The physics engine 504 may utilize a physics model of the game object to determine a simulated playback physical state (e.g., position, orientation, etc.) of the game object based on a physical state determined for the game object in the last most recent simulation period and the determined playback controls settings in the current simulation period. The physics engine 504 may determine, based on the determined playback control settings, one or more forces to be applied to the game object, and may apply the one or more forces to move the game object from the previous simulated playback physical state (e.g., previous position and orientation) to the simulated next simulated playback physical state (e.g., next position and orientation). As an example, the physics engine 504 may determine an acceleration force and/or a rotation force to be applied to a car, and may apply the acceleration force and/or the rotation force to move the car from its previous position/orientation to its next position/orientation resulting from the determined acceleration and/or rotation force.

With continued reference to FIG. 5, the playback state engine 500 may also include an playback physical state determination engine 506 and an error correction unit 508. The playback physical state determination engine 508 may be configured to determine a calculated playback physical state (e.g., position, orientation, etc.) of the game object at the common playback time 306 of the current simulation period. In an embodiment, the playback physical state determination engine 508 may determine the calculated playback physical state by interpolating between respective actual physical state values (e.g., actual position values, actual orientation values, etc.) obtained from the downlink spectator update frames 302 provided to the playback state engine 500 for the current simulation period. In an embodiment, the playback physical state determination engine 506 performs Hermite interpolation to interpolate between the actual physical state values. In other embodiments, the playback physical state determination engine 506 may utilize other suitable interpolation methods to interpolate between the actual physical state values to determine the calculated playback physical state based on the actual physical state values, or may utilize suitable techniques other than interpolation to determine the calculated playback physical state based on the actual physical state values.

The calculated playback physical state determined by the playback physical state determination engine 506 may be provided to the error correction unit 508. In addition to the calculated playback position determined by the playback physical state determination engine 506, the error correction unit 508 may receive the simulated playback physical state determined by the physics engine 504. The error correction unit 508 may determine a difference between the calculated playback physical state determined by the playback physical state determination engine 506 and the simulated playback physical state determined by the physics engine 504, and may provide a correction to the physics engine 504 based on the determined difference. For example, the error correction unit 508 may generate a correction value that is proportional to the determined difference, and may provide the correction value to the physics engine 504. The correction value may be applied as an additional force to the model implemented by the physics engine 504 to push a subsequent simulated playback physical state (e.g., simulated playback physical state determined for a next simulation period) in the direction of the difference between the simulated playback physical state and the calculated playback physical state.

In an embodiment, the error correction unit 508 may perform a comparison between the calculated playback physical state determined by the playback physical state determination engine 506 and the simulated playback physics state determined by the physics engine 504, to determine whether a new correction value is needed, and may provide a new correction value to the physics engine 504 only if it is determined that a new correction value is needed. For example, the error correction unit 508 may determine a difference between the calculated playback physical state determined by the playback physical state determination engine 506 and the simulated playback physical state determined by the physics engine 504, and may compare the absolute value of the difference to a threshold. If the simulated playback physical state determined by the physics engine 504 is sufficiently close to the calculated playback physical state determined by the playback physical state determination engine 506, as indicated by the absolute value of the difference between the calculated playback physical state and the simulated playback physical state not exceeding the threshold, this indicates that the physics engine 504 may be sufficiently accurate in determining the simulated playback physical state of the game object. In this case, the error correction unit 508 does not provide a new correction value to the physics engine 504. On the other hand, if the simulated playback physical state determined by the physics engine 504 is not sufficiently close to the calculated playback physical state determined by the playback physical state determination engine 506, such as if the absolute value of the difference between the calculated playback physical state determined by the playback physical state determination engine 506 and the simulated playback physical state determined by the physics engine 504 exceeds the threshold, this indicates that the physics engine 504 is not sufficiently accurate in determining the simulated playback physical state of the game object. In this case, the error correction unit 508 may generate a correction value, such as a correction value proportional to the difference between difference between the calculated playback physical state and the simulated playback physical playback state, and may provide the correction value to the physics engine 504.

Figure 6:
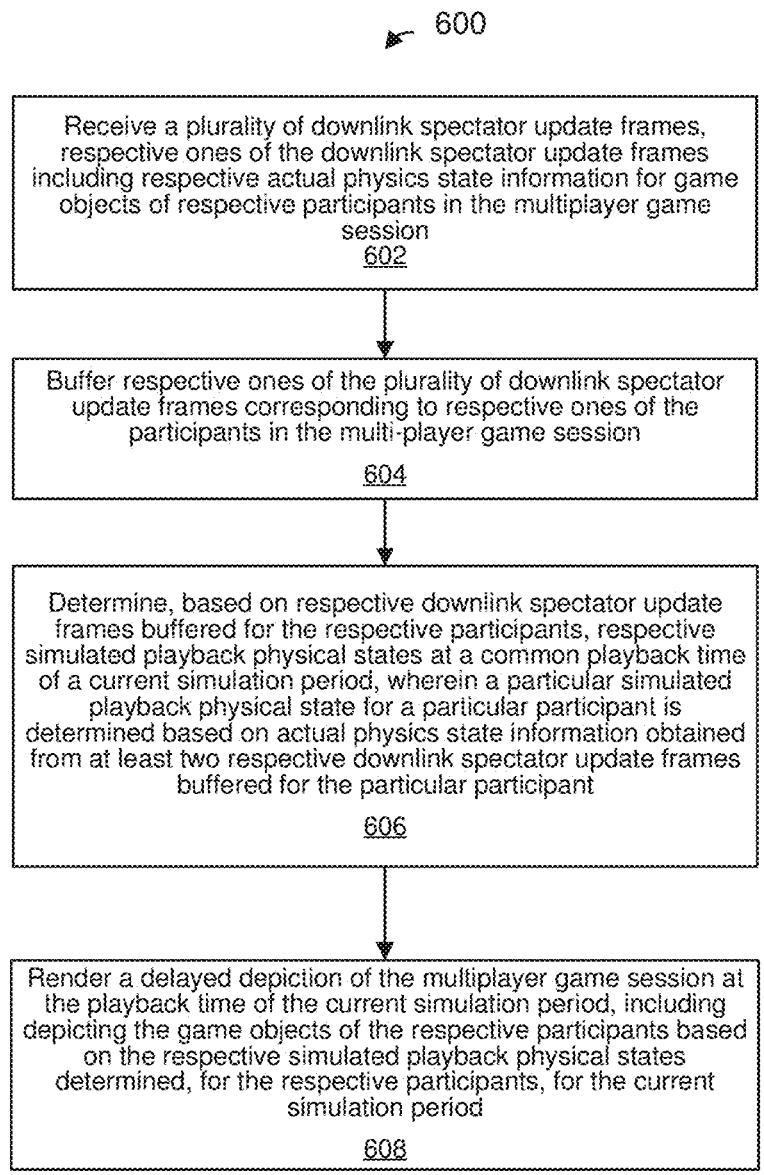
FIG. 6 is a flow diagram illustrating an example method that may be implemented in the system of FIG. 1 to provide a simulation of a multiplayer game session for a non-participating spectator of a multiplayer game session, according to an embodiment.

FIG. 6 is a flow diagram of a method 600 of providing a simulation of a multiplayer game session for a non-participating spectator of the multiplayer game session, according to an embodiment. In an embodiment, the method 600 is implemented in conjunction with the system 100 of FIG. 1. For example, the method 600 is implemented by the spectator client device 104 (e.g., the spectator client engine 134 of the spectator client device 104), in an embodiment. In other embodiments, the method 600 is implemented by suitable devices different from the spectator client device 104 and/or is implemented in conjunction with systems different from the system 100.

At block 602, a plurality of downlink spectator update frames are received by the spectator device 104 (e.g., the spectator client engine 134 of the spectator client device 104). Respective ones of the plurality of received downlink spectator update frames include respective physics state information for game objects of respective participants in the multiplayer game session. In an embodiment, a plurality of downlink spectator update frames 250, 302 of, respectively, FIGS. 2B and 3 are received. In other embodiments, other suitable downlink spectator update frames are received. In an embodiment, the received downlink spectator update frames omit any predicted physics state information.

At block 604, respective ones of the plurality of downlink spectator update frames are buffered. Respective ones of the plurality of downlink spectator update frames are buffered in accordance with one or more schemes described above with respect to FIGS. 3 and 4, for example, in an embodiment. For example, respective ones of the plurality of downlink spectator update frames are buffered in respective buffers as respective ordered sets of update frames for respective ones of the participants in the multiplayer game session, only certain update frames may be kept in the buffers, other update frames may be discarded, etc. In other embodiments, other suitable buffering schemes are utilized.

At block 606, based on respective downlink spectator update frames buffered at block 604, respective simulated playback physical states at a common playback time during a current simulation period are determined. In an embodiment, a particular simulated playback physical state for a particular participant is determined based on actual physics state information obtained from at least two respective downlink spectator update frames buffered for the particular participant. In an embodiment, the simulated playback physical states are determined as described above with respect to FIGS. 4 and 5. In other embodiment, the simulated playback physical states are determined in other suitable manners.

At block 608, a delayed depiction of the multiplayer game session at the playback time of the current simulation period is rendered. Rendering of the delayed depiction includes depicting the game objects of the respective participants based on the respective simulated playback physics states determined, for the respective participants, for the current simulation period.

Subsequently, respective simulated playback physical states at a common playback time during a next simulation period are determined, and rendering of the delayed depiction of the multiplayer game session is progressed based on the respective simulated playback physical states determined for the next simulation period, and so on.

Figure 7:
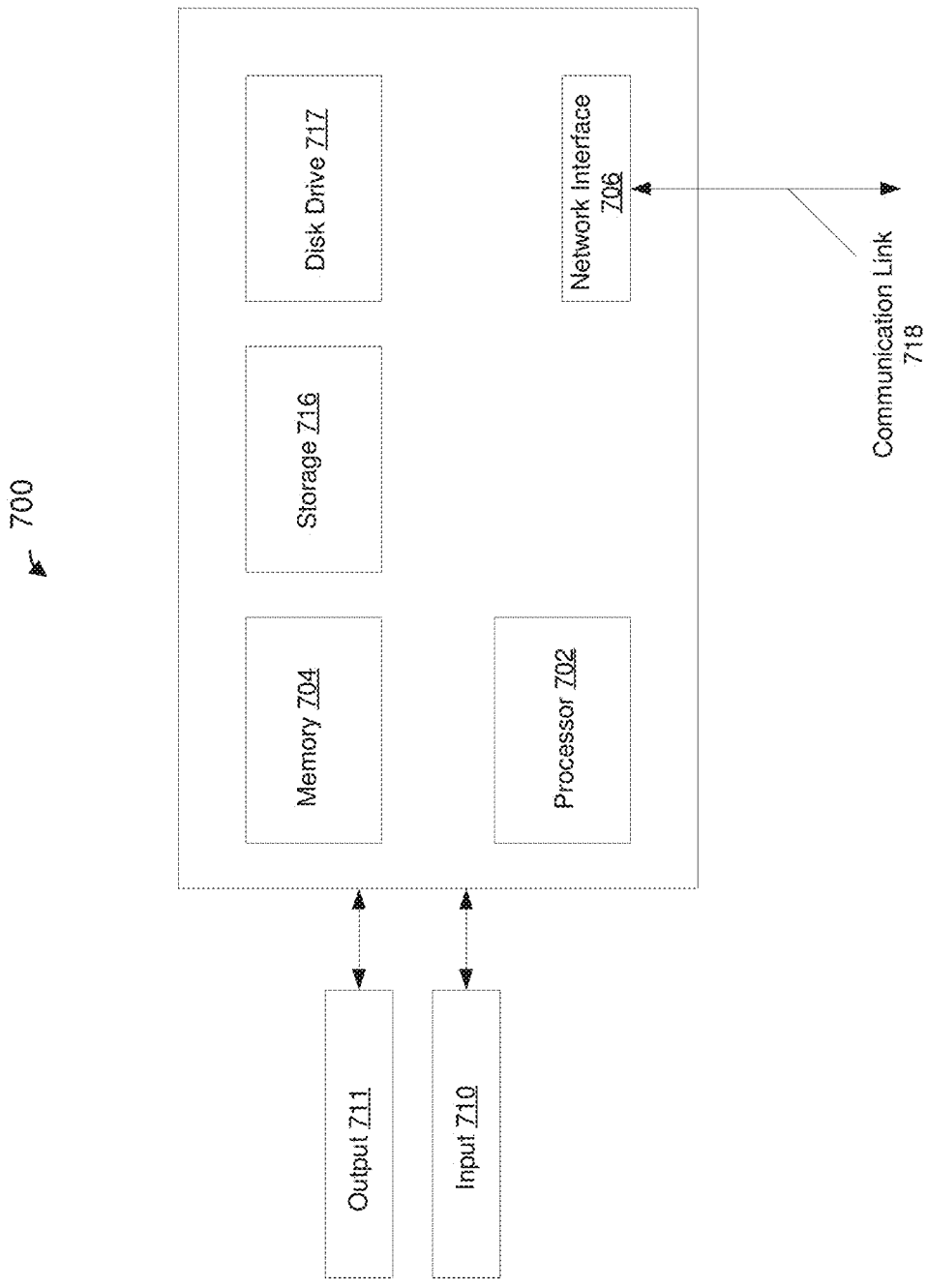
FIG. 7 is a block diagram of a computer system suitable for implementing one or more components of the system of FIG. 1, according to an embodiment.

FIG. 7 is a block diagram of a computing system 700 suitable for implementing one or more embodiments of the present disclosure. In its most basic configuration, the computing system 700 may include at least one processor 702 and at least one memory 704. The computing device 700 may also include a bus (not shown) or other communication mechanism for communicating information data, signals, and information between various components of computer system 700. Components may include an input component 710 that processes a user action, such as selecting keys from a keypad/keyboard, selecting one or more buttons or links, etc., and sends a corresponding signal to the at least one processor 702. Components may also include an output component, such as a display, 711 that may display, for example, results of operations performed by the at least one processor 702. A transceiver or network interface 706 may transmit and receive signals between computer system 700 and other devices, such as user devices that may utilize results of processes implemented by the computer system 700. In one embodiment, the transmission is wireless, although other transmission mediums and methods may also be suitable.

The at least one processor 702, which can be a micro-controller, digital signal processor (DSP), or other processing component, processes these various signals, such as for display on computer system 700 or transmission to other devices via a communication link 718. The at least one processor 702 may also control transmission of information, such as cookies or IP addresses, to other devices. The at least one processor 702 may execute computer readable instructions stored in the memory 704. The computer readable instructions, when executed by the at least one processor 702, may cause the at least one processor 702 to implement processes associated with determination of a user context, generation of customized translated content based on the user context, output of the customized translated content, etc. as described above.

Components of computer system 700 may also include at least one static storage component 716 (e.g., ROM) and/or at least one disk drive 717. Computer system 700 may perform specific operations by processor 712 and other components by executing one or more sequences of instructions contained in system memory component 714. Logic may be encoded in a computer readable medium, which may refer to any medium that participates in providing instructions to the at least one processor 702 for execution. Such a medium may take many forms, including but not limited to, non-transitory media, non-volatile media, volatile media, and transmission media. In various implementations, non-volatile media includes optical or magnetic disks, volatile media includes dynamic memory, such as system memory component 716, and transmission media includes coaxial cables, copper wire, and fiber optics. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physics medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations of a spectating system have been described herein in terms of "modules" or "components," it is noted that that terms are not limited to single units or functions. Moreover, functionality attributed to some of the modules or components described herein may be combined and attributed to fewer modules or components. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

What is claimed is:

1. A method of providing a simulation of a multiplayer game session for a non-participating spectator of the multiplayer game session, the method comprising:
    receiving, at a spectator client device from a server device, a plurality of downlink spectator update frames, respective ones of the downlink spectator update frames including respective actual physics state information for game objects of respective participants in the multiplayer game session, wherein the respective ones of the plurality of downlink spectator update frames are generated by the server device based on respective uplink participant update frames received by the server device from the corresponding participant client devices and a first periodicity of the uplink participant update frames sent to the server is different from a second periodicity of the downlink spectator update frames;
    buffering respective ones of the plurality of downlink spectator update frames corresponding to respective ones of the participants in the multiplayer game session in respective separate buffers associated with the corresponding participants, wherein a depth of each buffer is determined by a longest latency of respective latencies associated with transmission of the uplink participant update frames to the server device from the corresponding participant client devices;
    determining, based on respective downlink spectator update frames buffered for the respective participants, respective simulated playback physical states at a common playback time of a current simulation period at the spectator client device, wherein a particular simulated playback physical state for a particular participant is determined based on actual physics state information obtained from at least two respective downlink spectator update frames buffered for the particular participant; and
    rendering, with the client device, a delayed depiction of the multiplayer game session at the common playback time of the current simulation period, including depicting the game objects of the respective participants based on the respective simulated playback physical states determined for the respective participants, for the current simulation period.

2. The method of claim 1, wherein the respective downlink spectator update frames i) include the actual physics state information for the game objects of the respective participants and ii) omit predicted future physics state information for the game objects of the respective participants.

3. The method of claim 1, wherein determining the simulated playback physical state for the particular participant includes
    determining, based on actual control settings information obtained from the actual physics state information in each of the at least two of the respective downlink spectator update frames buffered for the particular participant, simulated playback control settings at the common playback time during the current simulation period, and
    determining the simulated playback physical state at the common playback time based at least in part on i) simulated playback physical state determined for the participant in a simulation period immediately preceding the current simulation period and ii) the determined simulated playback control settings at the common playback time of the current simulation period.

4. The method of claim 3, wherein determining the simulated playback control settings comprises interpolating between actual control settings obtained from each of the at least two of the respective downlink spectator update frames buffered for the particular participant.

5. The method of claim 3, wherein determining the simulated playback physical state for the particular participant includes determining, based on the simulated playback control settings, one or more forces to be applied to the game object of the particular participant.

6. The method of claim 3, further comprising
    determining, based on actual physics state information obtained from the actual physics state information in each of the at least two of the respective downlink spectator update frames buffered for the particular participant, calculated playback physical state at the common playback time of the current simulation,
    determining a difference between the calculated playback physical state and the simulated playback physical state,
    generating, based on the difference between the calculated playback physical state and the simulated playback physical state, a correction value, and
    applying the correction value as a corrective force in determining simulated playback physical state for the particular participant for at least one simulation period subsequent to the current simulation period.

7. A spectator client device, comprising:
    a buffering system configured to buffer a plurality of downlink spectator update frames received from a server device during a multiplayer game session, respective ones of the downlink spectator update frames including respective actual physics state information for game objects of respective participants in a multiplayer game session, the respective actual physics states obtained by the server device from respective uplink participant update frames received by the server device from respective participant client devices associated with the respective participants wherein a first periodicity of the uplink participant update frames sent to the server is different from a second periodicity of the downlink spectator update frames and the buffering system buffers respective ones of the downlink spectator update frames corresponding to respective ones of the participants in the multiplayer game session in respective separate buffers associated with the corresponding participants, wherein a depth of each buffer is determined by a longest latency of respective latencies associated with transmission of the uplink participant update frames to the server device from the corresponding participant client devices;

a playback state determination engine configured to determine based on respective downlink spectator update frames buffered for respective participants, respective simulated playback physical states at a common playback time of a current simulation period at the spectator client device, wherein a particular simulated playback physical state for a particular participant is determined based on actual physics state information obtained from at least two respective downlink spectator update frames buffered for the particular participant; and rendering engine configured to a delayed depiction of the multiplayer game session at the common playback time based on the playback physical states determined, for the respective participants, for the current simulation period.

8. The spectator client device of claim 7, wherein
the respective ones of the plurality of downlink spectator update frames are generated by the server device based on respective uplink participant update frames received by the server device from the corresponding participant client devices, and
the buffering system includes respective separate buffers for buffering downlink update for the respective participants, wherein a depth each buffer is determined by a longest latency of respective latencies associated with transmission of the uplink participant update frames to the server device from the corresponding participant client devices.

9. The spectator client device of claim 7, wherein the respective downlink spectator update frames i) include the actual physics state information for the game objects of the respective participants and ii) omit predicted future physics state information for the game objects of the respective participants.

10. The spectator client device of claim 7, wherein the playback state determination engine is configured to determine the simulated playback physical state for the particular participant at least by
determining, based on actual control settings information obtained from the actual physics state information in each of the at least two of the respective downlink spectator update frames buffered for the particular participant, simulated playback control settings at the common playback time of the current simulation period, and
determining the simulated playback physical state at the common playback time based at least in part on i) simulated playback physical state determined for the participant in a simulation period immediately preceding the current simulation period and ii) the determined simulated playback control settings at the common playback time of the current simulation period.

11. The spectator client device of claim 10, wherein the playback state determination engine is configured to determine the simulated playback control settings at least by interpolating between actual control settings obtained from each of the at least two of the respective downlink spectator update frames buffered for the particular participant.

12. The spectator client device of claim 10, wherein the playback state determination engine is configured to determine, based on the simulated playback control settings, one or more forces to be applied to the game object of the particular participant.

13. The spectator client device of claim 10, wherein the playback state determination engine is further configured to determine, based on actual physics state information obtained from the actual physics state information in each of the at least two of the respective downlink spectator update frames buffered for the particular participant, calculated playback physical state at the common playback time of the current simulation,
determine a difference between the calculated playback physical state and the simulated playback physical state,
generate, based on the difference between the calculated playback physical state and the simulated playback physical state, a correction value, and
apply the correction value as a corrective force in determining simulated playback physical state for the particular participant for at least one simulation period subsequent to the current simulation period.

14. A tangible computer readable medium, or media, storing machine readable instructions that, when executed by one or more processors, cause the one or more processors to:
receive a plurality of downlink spectator update frames transmitted by a server device, respective ones of the downlink spectator update frames including respective actual physics state information for game objects of respective participants in a multiplayer game session, the respective actual physics states obtained by the server device from respective uplink participant update frames received by the server device from respective participant client devices associated with the respective participants wherein a first periodicity of the uplink participant update frames sent to the server is different from a second periodicity of the downlink spectator update frames;
buffer the plurality of downlink spectator update frames received from the server device corresponding to respective ones of the participants in the multiplayer game session in respective separate buffers associated with the corresponding participants, wherein a depth of each buffer is determined by a longest latency of respective latencies associated with transmission of the uplink participant update frames to the server device from the corresponding participant client devices;
determine, based on respective downlink spectator update frames buffered for respective participants, respective simulated playback physical states at a common playback time of a current simulation period at a spectator client device, wherein a particular simulated playback physical state for a particular participant is determined based on actual physics state information obtained from at least two respective downlink spectator update frames buffered for the particular participant; and
render a delayed depiction of the multiplayer game session at the common playback time, including depicting the game objects of the respective participants based on the respective simulated playback physical states determined, for the respective participants, for the current simulation period.

15. The tangible computer-readable medium or media of claim 14, wherein the respective downlink spectator update frames i) include the actual physics state information for the game objects of the respective participants and ii) omit predicted future physics state information for the game objects of the respective participants.

16. The tangible computer-readable medium or media of claim 14, wherein the machine readable instructions, when executed by the one or more processors, cause the one or more processors to determine, based on actual control settings information obtained from the actual physics state information in each of the at least two of the respective downlink spectator update frames buffered for the particular participant, simulated playback control settings at the common playback time of the current simulation period, and determine the simulated playback physical state at the common playback time based at least in part on i) simulated playback physical state determined for the participant in a simulation period immediately preceding the current simulation period and ii) the determined simulated playback control settings at the common playback time of the current simulation period.

17. The tangible computer-readable medium or media of claim 14, wherein the machine readable instructions, when executed by the one or more processors, cause the one or more processors to determine the simulated playback control settings at least by interpolating between actual control settings obtained from each of the at least two of the respective downlink spectator update frames buffered for the particular participant.

18. The tangible computer-readable medium or media of claim 14, wherein the machine readable instructions, when executed by the one or more processors, cause the one or more processors to determine, based on the simulated playback control settings, one or more forces to be applied to the game object of the particular participant.

19. The tangible computer-readable medium or media of claim 14, wherein the machine readable instructions, when executed by the one or more processors, cause the one or more processors to determine, based on actual physics state information obtained from the actual physics state information in each of the at least two of the respective downlink spectator update frames buffered for the particular participant, calculated playback physical state at the common playback time of the current simulation, determine a difference between the calculated playback physical state and the simulated playback physical state, generate, based on the difference between the calculated playback physical state and the simulated playback physical state, a correction value, and apply the correction value as a corrective force in determining simulated playback physical state for the particular participant for at least one simulation period subsequent to the current simulation period.

* * * * *